United States Patent [19]
Carveth

[11] 3,733,921
[45] May 22, 1973

[54] REINFORCED PLASTIC GEAR

[76] Inventor: William H. Carveth, 11329 79th Avenue, Edmonton, Alberta, Canada

[22] Filed: Oct. 15, 1971

[21] Appl. No.: 189,517

[52] U.S. Cl. .................................... 74/439, 29/159.2
[51] Int. Cl. .............................................. F16h 55/12
[58] Field of Search .............................. 74/439, 434; 29/159.2

[56] References Cited
UNITED STATES PATENTS 3,469,468   9/1969   Cozzarin et al. .................... 74/439 X
3,469,467   9/1969   Seaman ............................... 74/439 X Primary Examiner—Leonard H. Gerin
Attorney—Fetherstonaugh & Co.

[57] ABSTRACT

A gear formed of plastic by a molding process, and having an annular reinforcing member incorporated within the gear to strengthen the teeth thereof. The reinforcing member is a perforated strip having radial projections which are sized and shaped substantially to conform to the gear teeth. Preferably, the reinforcing member itself is reinforced by one or more annular stiffeners.

5 Claims, 4 Drawing Figures

PATENTED MAY 22 1973
3,733,921
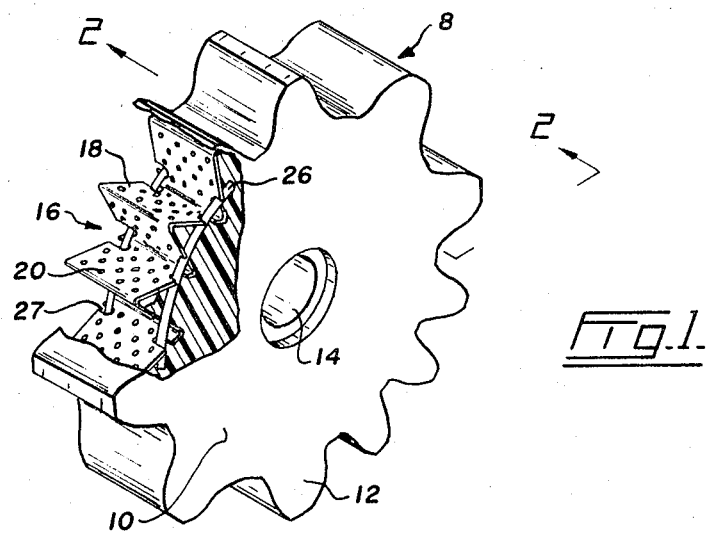
Fig.1.
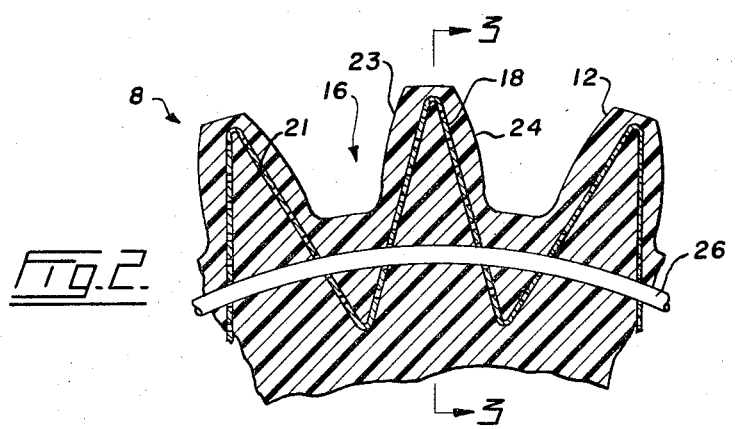
Fig.2.
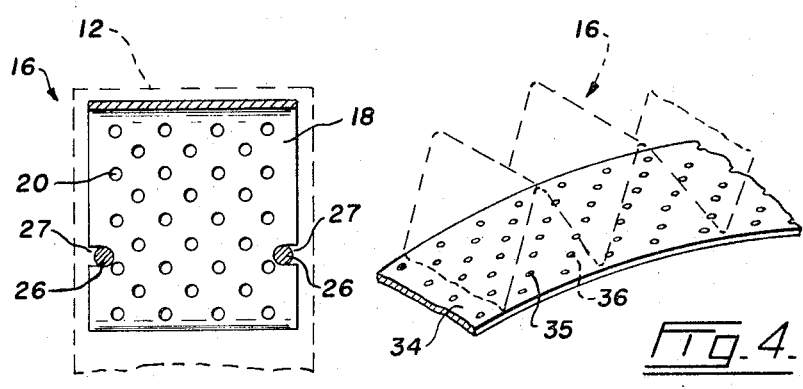
Fig.3.
Fig.4.

REINFORCED PLASTIC GEAR

This invention relates to the manufacture of plastic gears and is particularly concerned with a plastic spur gear having an internal reinforcing member which provides support for the gear teeth.

It has long been recognized that certain types of plastics can be used in the manufacture of gears. Gears made entirely of plastic, or metal gears which are coated with plastic, can often be made to operate more smoothly and certainly more quietly than most metal gears. Further, plastics usually can be molded and machined more easily than metals and in some cases the wearing qualities of certain plastics actually exceed those of the metals they replace.

On the other hand, all plastics do have strength limitations and it is often the plastics that are most desirable from other points of view that are the weakest. Thus, for example, a gear made of a relatively soft and flexible plastic might run very quietly and smoothly but be too weak to be practical. For spur gears it is often the case that a certain desirable plastic may be suitable for the main web portion of the gear but is much too weak in the area of the teeth.

It is, therefore, a primary object of this invention to provide a spur gear formed of plastic by a molding process which is sufficiently strong in the area of the gear teeth to transmit the design loads.

It is a more specific object of the invention to provide a spur gear as above defined which can be manufactured at a reasonable cost.

The above and further objects of the invention are accomplished by a spur gear formed of plastic by a molding process in which is incorporated a reinforcing member essentially consisting of a strip of a form retaining material which is formed into a circle and bent at regularly and circumferentially spaced points to provide radially outward projecting teeth reinforcing elements. As a preferred expedient, the strip is perforated so that when it is incorporated within the gear during the molding process, plastic flows through the perforations so that when the plastic has hardened the reinforcing element is effectively locked against any tendency to shift within the body of the plastic.

The invention will be more throughly understood from the following description of a preferred embodiment thereof as read in conjunction with the accompanying drawings.

In the drawings,

FIG. 1 is a perspective view, partly broken away, of a spur gear exemplifying the gears which can be constructed in accordance with this invention, FIG. 2 is a cross-sectional view taken along the line 2—2 of FIG. 1, FIG. 3 is a section taken on the line 3—3 of FIG. 2, and FIG. 4 is a perspective view of a modified reinforcement for that plastic spur gear.

Referring to FIG. 1, the numeral 8 generally indicates a gear which in its outward appearance, has as the usual spur gear configuration including a main body part or web portion 10, a plurality of teeth 12 around its outer periphery, and a central hub 14 by which the gear can be attached to a shaft. The gear 8 is produced by a molding process although it is not essential to the invention that the molding step, by itself, produces the final form of the gear shown in FIG. 1. In other words, while the spur gear of the invention is defined as having been made by a molding process, this definition includes the possibility that the gear may have been molded into a circular blank and then machined to produce the teeth. Further, there is included the possibility that the gear as molded includes the teeth but that a latter machining step has been carried out to produce the central hub. It is essential however that the gear be processed by molding to an extent sufficient to permit incorporation of a reinforcing member 16 within it. In this regard it should also be noted that it does not matter if the gear 8 is made by placing the reinforcing member 16 in the mold and then pouring the plastic resin (preferably, urethane elastomer) into the mold, or whether the resin be poured into the mold first with the reinforcing member being embedded in the plastic before it has finally set.

As can be seen in FIGS. 1, and 2, the reinforcing member 16 essentially consists of a strip of a form retaining material such as steel which has been formed into a circle and bent at regularly and circumferentially spaced points into radially projecting, teeth reinforcing elements 18. While steel is the preferred material for use in the reinforcing member 16, it will be appreciated that other materials could be used without departing from the invention. Obviously, if a material other than steel was formed sufficiently strong enough to adequately support the gear teeth 12 against the stresses of the design load, and the cost of that other material was appreciably less than steel, then it would be the preferred material.

It will also be appreciated that while the reinforcing member 16 as described above consists of a strip of steel or the like which has been bent into the illustrated shape, an alternative procedure would be to make said reinforcing member by casting or molding. Indeed, it would fall within the scope of the invention to utilize a one-piece molded reinforcing member of a strong plastic which could be used to reinforce a gear made of a weaker plastic. Needless to say, on the other hand, it is essential that the two materials used in the main body of the gear and in the reinforcing member be compatible.

The reinforcing member 16 is provided with a large number of perforations 20. As shown best in FIG. 3, the perforations 20 are arranged in rows which are disposed parallel to the axis of rotation of the gear 8. The holes or perforations 20 of each row are staggered with respect to the holes of an adjacent row. There are rows of perforations 20 near the crest or outer end of each of the tapered elements 18, or one row on each side thereof as shown in FIG. 2. Thus, when the plastic, during the molding process, flows through these perforations 20, the plastic on either side of the strip is interconnected by integral plugs 21, see FIG. 2. When the plastic has set, the reinforcing member 16 is positively locked against any tendency to shift within the plastic body which is keyed to the member by the plugs 21.

Referring now to FIG. 2, it can be seen that the radially outward projections 18 of the reinforcing member are substantially A-Shaped and extend almost to the outer ends of the teeth so that the latter are very adequately reinforced against the stresses they are subjected to when in operation. Preferably, one face 23 of each tooth 12 is spaced further from the radial axis of the A-shaped element 18 than the opposite face 24 is spaced from that axis. The face 23 is intended as the pressure face, i.e., the one which is engaged by the corresponding face of a tooth on a driving pinion or the like, and therefore a greater thickness of plastic is provided on that side of the gear tooth.

The corrugated strip which forms the reinforcing member 16 is braced and supported against both radial and circumferential movement by a pair of stiffeners 26. These hoop-like stiffeners 26 preferably are formed of metal which is circular in cross-section as shown in FIG. 3 which particularly shows that the two stiffeners are received in recesses 27 formed in the side edges of the reinforcing member. The choice of material for the stiffeners 26 is optional but obviously they must be sufficiently strong and rigid to lend rigidity to the gear as a whole.

In manufacturing the gear of the invention the first step is to combine the reinforcing member 16 with the stiffeners 26. This can be done in a number of different ways, for example, by tack welding the stiffeners to the strip. Under certain conditions, it is not necessary to weld the stiffeners to the strip. For example, when the stiffeners 26 have a diameter which is equal to the depth of recesses 27, the reinforcing member 16 can be loosely assembled within the mold by first dropping in one of the stiffeners and then placing the strip on top of it so that the recesses 27 on the bottom edge of the strip fits over the stiffener. Then a second stiffener is laid in the recesses on the top edge of the strip.

In any case, whether the reinforcing member is preassembled or assembled within the mold, the actual molding is carried out by pouring or injecting the plastic resin into the mold and allowing it to set. Needless to say, if desired the metal hub 14 can be located in the mold before pouring or injecting of the resin commences or the hub may be pressed into the poured resin before it finally sets.

Referring to the embodiment of the invention illustrated in FIG. 4, the reinforcing member 16 will be seen to be strengthened by a stiffener 34. The metal member 34 is a circular band of the same material used to form the member 16, viz., it has rows of perforations 35 which admit plastic in the molten state to form plugs 36 as before. Member 16 and the annular stiffener 34 can be secured together by spot welding if desired. Since the plastic material and the stiffener 34 are locked or keyed together by the plugs 36 there is little likelihood of any relative movement taking place therebetween and the member 16 is properly supported against distortion.

From the foregoing it will be apparent there is provided a reinforced plastic gear which can be readily manufactured at a much lower cost than a conventional metal gear. A plastic having the desired wear and other characteristics can be chosen for the gear and the selected material is adequately strengthened by the reinforcement added. The reinforcing metal members embedded in the plastic will yield slightly with the synthetic material so as to withstand sudden shock loads yet will give the required strength to the gear under normal operation conditions.

I claim:

1. A gear comprising a blank formed of plastic by a molding process to provide teeth thereon, a reinforcing member incorporated within the plastic gear for strengthening the gear teeth, said reinforcing member being a strip of a form retaining material having a width substantially equal to the thickness of the gear teeth, said strip being formed into a full circle and being bent at regularly and circumferentially spaced points into radially projecting, teeth reinforcing elements and the strip being perforated to key the plastic material to the reinforcing member.

2. A gear as claimed in claim 1, and including an annular stiffener supporting the strip against distortion.

3. A gear as claimed in claim 2, in which said annular stiffener is a perforated band of a material similar to the strip.

4. A gear as claimed in claim 1, and including a pair of transversely spaced annular stiffeners supporting the strip against distortion.

5. A gear comprising a blank formed of plastic by a molding process to provide teeth thereon, a reinforcing member incorporated into the plastic gear during the molding process to strengthen the gear teeth, said reinforcing member being a perforated strip extending in a full circle around the plastic gear and shaped to provide substantially radially projecting teeth reinforcing elements with the plastic on either side of said strip being interconnected by integral plugs received in the perforations of the strip, and a pair of stiffeners attached to and supporting the strip against distortion.

* * * * *